UNITED STATES PATENT OFFICE.

R. E. CAMPBELL, OF NEW YORK, N. Y.

IMPROVED MODE OF PREPARING BURNING-FLUID.

Specification forming part of Letters Patent No. 59,177, dated October 30, 1866.

*To all whom it may concern:*

Be it known that I, R. E. CAMPBELL, of the city, county, and State of New York, have invented a certain new and Improved Composition of Matter and Process of Making the Same; and I hereby declare that the following is a full and sufficient description thereof, reference being had to the recipes and specific composition of matter treated.

The nature of the invention consists in combining certain bodies with the first runnings of the distillate of petroleum, petroleum-oil, or coal-oil. These first runnings of the several distillates give a volatile liquid highly inflammable and explosive when mixed with air, and consequently this product is, in its unrefined state, totally unfit to be used as a burning-fluid. I have ascertained, however, that by digesting this liquor on certain absorbent substances at common temperatures, such as burnt clay, chalk, and dried chloride of sodium, the objectionable features of the liquid disappear, and the same may be used as a burning-fluid, giving a clear and white light, both cheap and durable, and free from danger of explosion.

To enable others skilled in the arts to make and use my invention, I proceed as follows: I take ten pounds of best pure clay and expel the water by heat at somewhat less than a red heat, and pulverize it; seven pounds pulverized chalk well dried, and four pounds common salt, also dried at nearly a red heat. I sometimes add a fourth article—namely, lime in the caustic state. To these articles, in a suitable vessel, I add twenty-one gallons of the aforesaid crude distillate, and, after stirring them thoroughly together, allow them to digest some three days, (more or less,) with frequent agitation. At the end of this time it will be found that the liquid will have lost its highly inflammable and explosive character, and will have become a valuable burning-fluid.

The clear liquid is to be decanted from the dregs, and to be used in the manner aforesaid. The volatile and explosive materials of this crude distillate, by the treatment aforesaid, are not destroyed, but are merely absorbed, and may be recovered again by distillation of the earthy matters in a suitable still and condensed in a suitable worm.

In the composition of the earthy materials, although we have given such proportions above as have been found effectual in practice, it is possible to get a similar result by changing somewhat the proportions of the clay, chalk, and salt, or the proportion of liquid to that of the earthy matters, taken as a whole.

I do not in so modifying my composition travel out of the pale of my invention, because the invention consists in withdrawing the volatile and explosive part of the fluid by absorbing it away with foreign substances, instead of removing it by fractional distillation, the usual method of separating the objectionable material.

The value of the present plan of working is, that it is a safe and effective operation, and that it is a more perfect separator than the process by heat, which always carries over with the current of lighter vapor some of that which is heavier, and especially in the latter part of the distillation.

What I claim as my invention, and desire to secure by Letters Patent, is—

Treating the first runnings of the distillate of petroleum, petroleum-oil, or coal-oil by passing them through or mixing them with burnt clay, chalk, chloride of sodium, or other equivalent absorbent substances, in the manner and for the purposes substantially as herein set forth.

R. E. CAMPBELL.

Witnesses:
D. C. VAN COTT,
L. D. GALE.